United States Patent
Bader et al.

(10) Patent No.: US 10,759,256 B2
(45) Date of Patent: Sep. 1, 2020

(54) METHOD AND APPARATUS FOR SETTING A THERMAL COMFORT STATE

(71) Applicant: VOLKSWAGEN AKTIENGESELLSCHAFT, Wolfsburg (DE)

(72) Inventors: Viktor Bader, Wolfsburg (DE); Christoph Wäller, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 430 days.

(21) Appl. No.: 15/513,679

(22) PCT Filed: Sep. 7, 2015

(86) PCT No.: PCT/EP2015/070365
§ 371 (c)(1),
(2) Date: Mar. 23, 2017

(87) PCT Pub. No.: WO2016/045948
PCT Pub. Date: Mar. 31, 2016

(65) Prior Publication Data
US 2017/0282685 A1    Oct. 5, 2017

(30) Foreign Application Priority Data

Sep. 25, 2014   (DE) .................. 10 2014 219 408

(51) Int. Cl.
*B60H 1/00*    (2006.01)
(52) U.S. Cl.
CPC ..... *B60H 1/00742* (2013.01); *B60H 1/00792* (2013.01); *B60H 1/008* (2013.01); *B60H 1/0075* (2013.01); *B60H 1/00757* (2013.01)

(58) Field of Classification Search
CPC ............ B60H 1/00742; B60H 1/00792; B60H 1/0075; B60H 1/00757; B60H 1/008
(Continued)

(56) References Cited

U.S. PATENT DOCUMENTS 6,659,360 B1 * 12/2003 Schaefer ................ B60H 1/008
236/51
9,224,175 B2 * 12/2015 Frank ..................... G06Q 10/00
(Continued)

FOREIGN PATENT DOCUMENTS

DE    4113374 A1    10/1991
DE    29722809 U1    2/1998
(Continued)

OTHER PUBLICATIONS

Geek Watch; downloaded from http://www.google.de/imgres?imgurl-http%3A%2F%2Fimg_netzwelt.de . . .; downloaded Apr. 11, 2014.
(Continued)

*Primary Examiner* — Claire E Rojohn, III
(74) *Attorney, Agent, or Firm* — Barnes & Thornburg LLP

(57) ABSTRACT

A method for setting a thermal comfort state of at least one user of a vehicle, wherein, at a starting time, at least one actual state variable of the user is detected by at least one device for detecting the at least one state variable and a starting comfort state of the user is determined depending on the at least one actual state variable, wherein a target comfort state is determined, wherein at least one target state variable is determined depending on the target comfort state, wherein at least one vehicle-end device for changing the state variable is controlled so that a deviation in the actual state variable from the target state variable is minimized when the target comfort state deviates from the starting comfort state, wherein the at least one state variable is detected by a device (Continued)

carried by the user for detecting the at least one state variable.

14 Claims, 4 Drawing Sheets

(58) Field of Classification Search
USPC .......................................................... 165/202
See application file for complete search history.

(56) References Cited

U.S. PATENT DOCUMENTS

| | | | |
|---|---|---|---|
| 9,396,437 B2* | 7/2016 | Ponomarev | H04W 4/70 |
| 9,646,428 B1* | 5/2017 | Konrardy | G08G 1/096741 |
| 9,814,993 B2* | 11/2017 | Ponomarev | A63H 3/28 |
| 9,914,359 B2* | 3/2018 | Brewer | B60K 28/06 |
| 9,937,792 B2* | 4/2018 | Nania | B60K 28/066 |
| 10,019,070 B2* | 7/2018 | Szczerba | G06F 3/017 |
| 10,031,534 B1* | 7/2018 | Devenish | F24F 11/46 |
| 10,172,566 B2* | 1/2019 | Papaix | A61B 5/0002 |
| 10,185,999 B1* | 1/2019 | Konrardy | G07C 5/008 |
| 10,247,438 B2* | 4/2019 | Bender | G06N 5/043 |
| 10,335,060 B1* | 7/2019 | Kahn | A61B 5/681 |
| 10,372,093 B2* | 8/2019 | Davalos | G05B 15/02 |
| 10,415,841 B2* | 9/2019 | Deilmann | G05B 15/02 |
| 2011/0022393 A1* | 1/2011 | Waller | G06F 3/038 |
| | | | 704/270 |
| 2011/0175843 A1* | 7/2011 | Bachfischer | B60K 37/06 |
| | | | 345/174 |
| 2012/0312520 A1* | 12/2012 | Hoke | B60H 1/00285 |
| | | | 165/203 |
| 2013/0102852 A1 | 4/2013 | Kozloski et al. | |
| 2014/0095000 A1* | 4/2014 | Waller | G06F 3/1454 |
| | | | 701/2 |
| 2014/0207292 A1* | 7/2014 | Ramagem | G05D 23/1902 |
| | | | 700/278 |
| 2014/0240132 A1* | 8/2014 | Bychkov | A61B 5/18 |
| | | | 340/576 |
| 2014/0367079 A1* | 12/2014 | DiFulgentiz, III | F24F 11/62 |
| | | | 165/237 |
| 2015/0039877 A1* | 2/2015 | Hall | G06F 1/32 |
| | | | 713/2 |
| 2015/0094914 A1* | 4/2015 | Abreu | B60H 1/00742 |
| | | | 701/41 |
| 2015/0116078 A1* | 4/2015 | Mishra | G07C 9/257 |
| | | | 340/5.51 |
| 2015/0168002 A1* | 6/2015 | Plitkins | F24F 11/70 |
| | | | 165/237 |
| 2015/0313475 A1* | 11/2015 | Benson | A61B 5/0205 |
| | | | 297/217.3 |
| 2015/0362997 A1* | 12/2015 | Hatton | G06F 3/017 |
| | | | 701/2 |
| 2016/0082808 A1* | 3/2016 | Perkins | B60H 1/00871 |
| | | | 165/11.2 |
| 2018/0229583 A1* | 8/2018 | Craig | B60H 1/0075 |

FOREIGN PATENT DOCUMENTS

| | | |
|---|---|---|
| DE | 19648038 A1 | 5/1998 |
| DE | 19860235 A1 | 7/2000 |
| DE | 10056692 A1 | 5/2002 |
| DE | 20022905 U1 | 6/2002 |
| DE | 10129159 A1 | 12/2002 |
| DE | 10141118 A1 | 3/2003 |
| DE | 10252358 A1 | 5/2003 |
| DE | 10352188 A1 | 6/2005 |
| DE | 202007003145 U1 | 8/2007 |
| DE | 102008007725 A1 | 8/2008 |
| DE | 102008059553 A1 | 6/2010 |
| JP | S62125243 A | 6/1987 |
| WO | 2008084370 A1 | 7/2008 |
| WO | WO-2008084370 A1 * | 7/2008 ......... B60H 1/00742 |

OTHER PUBLICATIONS

ISO 7730; Ergonomics of the thermal environment—Analytical determination and interpretation of thermal comfort using calculation of the PMV and PPD indices and local thermal comfort criteria; downloaded from https://webstore.ansi.org/RecordDetail.aspx?sku=ISO%207730:2005&gclid=CjwKEAjww . . .; 2005.

ISO 14505-2; Ergonomics of the thermal environment—Evaluation of thermal environments in vehicles—Part 2: Determination of equivalent temperature; downloaded from https://webstore.ansi.org/RecordDetail.aspx?sku=ISO%2014505-2:2006&source=google& . . .; 2006.

Kaufmann; New territories of networking; downloaded from http://www.haruki.de/2013/04/22/neue-tenitorien-der-vernetzung/; 2013.

Nissan; Nissan Nismo Smartwatch misses car and man; downloaded from https://www.golem.de/news/nissan-nismo-smartwatch-vermisst-auto-und-mensch-1309-10 . . .; 2013.

Search Report for German Patent Application No. 10 2014 219 408.3; dated Dec. 4, 2015.

Search Report and Written Opinion for International Patent Application No. PCT/EP2015/070365; dated Nov. 23, 2015.

* cited by examiner

METHOD AND APPARATUS FOR SETTING A THERMAL COMFORT STATE

PRIORITY CLAIM

This patent application is a U.S. National Phase of International Patent Application No. PCT/EP2015/070365, filed 7 Sep. 2015, which claims priority to German Patent Application No. 10 2014 219 408.3, filed 25 Sep. 2014, the disclosures of which are incorporated herein by reference in their entirety.

SUMMARY

Illustrative embodiments relate to a method and to an apparatus for setting a thermal comfort state of at least one user of a vehicle.

BRIEF DESCRIPTION OF THE DRAWINGS

Disclosed embodiments are explained in greater detail with reference to the figures, in which.

DETAILED DESCRIPTION OF THE DISCLOSED EMBODIMENTS

Figure 1:
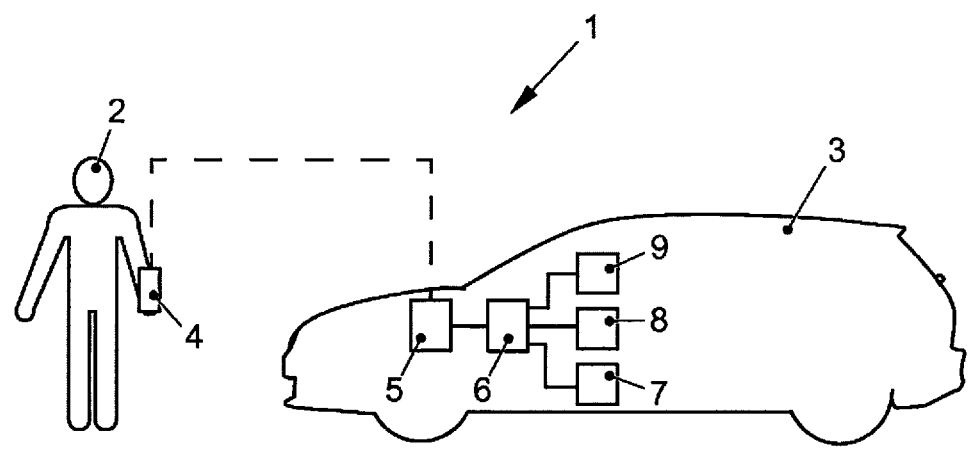
FIG. 1 is a block diagram of a disclosed apparatus.

DE 196 48 038 A1 discloses a method for controlling a heating and/or air-conditioning system, optionally of vehicles. In the method, sensors are used to determine a physiological parameter of an individual, and the system is controlled according to this parameter and on the basis of an appropriate program. In DE 196 48 038 A1, the parameter is determined optically. Examples of suitable parameters include parameters such as the skin temperature, skin humidity and pulse rate. DE 196 48 038 A1 describes optical and electrical sensors, although these sensors are arranged in the vehicle in each case. In this regard, the document proposes that the sensors are located at those points in the vehicle that are touched when the vehicle or relevant fitted parts are operated.

The publication, K. Kaufmann, "Neue Territorien der Vernetzung" ("New territories for networking"), Apr. 22, 2013 (available at
http://www.haruki.de/2013/04/22/neue-territorien-der-vernetzung) describes what are known as smartwatches. The publication describes that equipment, for instance an air conditioning system in the car, can be controlled via a smartwatch. The publication does not describe, however, any sensors of such smartwatches.

The publication "Nissan Nismo: Smartwatch vermisst Auto and Mensch—golem.de" ("Nissan Nismo: smartwatch keeps track of man and vehicle—golem.de")
(available at http://www.golem.de/news/nissan-nismo-smartwatch-vermisst-auto-und-mensch-1309-101546.html), likewise describes a smartwatch, which can receive and display performance data on the driver and vehicle. This publication does describe sensors of the smartwatch, but only specifies the recording of medical data on the driver and displaying the data to the driver. It does not describe using data acquired by sensors to set a thermal comfort state.

DIN EN ISO 7730 and DIN EN ISO 14505-2 each specify associating a person's individual heat input or heat output with a thermal comfort state, i.e., with a PMV index (predicted mean vote index). This association can be specified for the entire body or for predetermined parts of the body.

The technical problem presented is to provide a method and an apparatus for setting a thermal comfort state of at least one user of a vehicle, which improve, i.e., speed up, setting a desired thermal comfort state.

A method for setting a thermal comfort state of at least one user of a vehicle is proposed. The user can also be referred to as a vehicle occupant if the user is located inside the vehicle. As explained in greater detail below, the thermal comfort state can be set, for example, by setting parameters of a heat input or heat output into/out of at least part of the vehicle interior. For example, parameters of a heat input or heat output may be a temperature and/or a volume of air supplied or removed. Thus the method for setting a thermal comfort state can also be referred to as a method for setting parameters of a heat input or heat output into/out of at least part of the vehicle interior. Of course the method can also be used for setting thermal comfort states in different climate zones of the vehicle.

As also explained in greater detail below, the thermal comfort state can be set by at least one in-vehicle variation unit for varying a state variable of the thermal comfort state. Such state variables are described in greater detail below. For example, such a unit may be an air conditioning system of the vehicle, a heating system of the vehicle or a ventilation system of the vehicle. Thus the method for setting a thermal comfort state may also be a method for controlling at least one variation unit for varying a state variable of the thermal comfort state.

In the method, at a start time at least one actual state variable of the user is acquired by an acquisition unit for acquiring the at least one state variable. In this case, the state variable denotes a variable which on being altered also alters, or at least may alter, a thermal comfort state of the user. The thermal comfort state in this case refers to a subjective sensation expressing a satisfaction with an ambient climate.

A plurality of actual state variables may be acquired. A skin temperature and/or a skin humidity of the user may be defined as the state variables. The actual state variable can depend on, or be related to, a person's individual heat input and/or heat output. The acquisition unit can comprise, for example, different subunits for acquiring the different state variables. For instance, the acquisition unit can also comprise or include both a skin temperature sensor and a skin humidity sensor. Evidently, however, a plurality of acquisition units can also be used, each acquiring different state variables.

An initial comfort state of the user is defined on the basis of the at least one actual state variable. The initial comfort state thus denotes a thermal comfort state of the user at the start time. In this case, there can be an association, known in advance, between the at least one actual state variable and a thermal comfort state. Such an association can be given, for example, as a functional relationship or as what is known as a lookup table (conversion table). The association known in advance can be determined, for example, in preliminary tests. The association may be a generic association, i.e., an association that applies to a plurality of users or all users, or a user-specific association, i.e., an association that applies only to at least one user.

The association specified in DIN EN ISO 7730, which was described in the introduction, or in DIN EN ISO 14505-2, may be used. These publications specify an association of an actual state variable, i.e., a person's individual heat input and/or heat output, to a thermal comfort state, which association has been obtained on the basis of empirical studies, where the thermal comfort state can be given as a comfort index, for instance the PMV index.

Of course it is also possible, however, that the comfort state is equivalent to the at least one state variable, for instance, in the case when only one state variable is used.

The comfort state can be defined as a comfort index, for example.

The start time denotes, for example, a time at which the user gets into the vehicle. The time can be ascertained, for instance, when the user opens a vehicle door or enters a predetermined region surrounding the vehicle. For this purpose, for example, a distance between vehicle and user can be acquired, for instance by means of communication between a unit worn by the user, e.g., the aforementioned acquisition unit, and a vehicle-based unit. The time of opening the vehicle door can also be acquired by means of suitable sensors, for example. In addition, the start time may be an ignition time, which denotes, for example, the time at which the vehicle ignition is switched on. The start time may also be a time at which a vehicle seat of the vehicle becomes occupied. Once again, this time can be acquired by suitable sensors, for example, load cells in the vehicle seat.

In addition, a target comfort state is defined. The target comfort state can be a preset generic or user-specific comfort state. The target comfort state can be defined as a target comfort index.

In addition, at least one target state variable is defined on the basis of the target comfort state. The at least one target state variable can be defined here as the same parameter, for example, a skin temperature, as the actual state variable acquired at the start time. The aforementioned association known in advance between a comfort state and the at least one state variable can again be used for this purpose.

Furthermore, at least one vehicle-based variation unit for varying the state variable is controlled such that a difference between the actual state variable and the target state variable is minimized. The variation unit for varying the state variable can be a unit for varying climate parameters inside the vehicle. In this case, the at least one state variable of the user can be varied by means of the climate parameters inside the vehicle and can be a unit for varying an interior temperature and/or a unit for varying an air flow into and out of the vehicle interior. For example, the variation unit for varying the state variable may be an air conditioning system, a heating system or a ventilation system of the vehicle. The variation unit for varying the state variable may, however, also be a unit for directly varying the state variable of the user, for instance may be an infrared radiation unit.

Controlling the vehicle-based variation unit for varying the state variable and, if applicable, even defining the target state variable, is performed if the target comfort state differs from the initial comfort state, i.e., differs by more than a predetermined amount.

Thus the variation unit can be controlled on the basis of the difference so as to minimize the difference. At least one input variable or a variation over time of an input variable (manipulated variable or reference input) of the variation unit can be defined such that the difference is minimized in the minimum amount of time or within a predetermined time period.

The at least one state variable is acquired by a unit worn by the user. This means that the acquisition unit is not based at the vehicle but is based with the user. Being wearable, i.e., portable, can mean that when the location of the user changes in a global coordinate system, the location of the acquisition unit also changes by the same amount.

This allows state variables to be acquired more reliably and more quickly, because the relevant acquisition unit is in the immediate vicinity of the user. Another outcome is that the state variable can be acquired not just solely went the user is located in the detection range of a vehicle-based acquisition unit. It is thereby possible to acquire the state variable even prior to the start time, for instance the time of getting into the vehicle. This in turn can improve the method for setting the thermal comfort state, as explained in greater detail below.

For instance, the acquisition unit can comprise at least one communications unit for signal communication and/or data communication with a communications unit of the vehicle. The acquisition unit can transmit, for example, the at least one acquired state variable to the vehicle. It is also possible that the acquisition unit, for instance, an analysis unit of this acquisition unit, determines and transmits to the vehicle the initial comfort state, the target comfort state, the at least one target state variable and/or difference between the actual state variable and the target state variable. Thus individual method operations can be performed either by the user-based acquisition unit or can be performed on-board the vehicle.

As explained in greater detail below, the acquisition unit can also define control profiles for controlling the vehicle-based variation unit for varying the state variable, and can transmit the control profiles to the vehicle, for example, to the vehicle-based variation unit for varying the state variable.

The acquisition unit can also comprise at least one memory unit, it being possible to store in the at least one memory unit the aforementioned association known in advance between the at least one state variable and the comfort state. It is also possible for at least one control profile for the vehicle-based variation unit to be stored in the at least one memory unit.

For example, the acquisition unit can be a mobile terminal, for instance, a cellphone or a pair of glasses or a belt, or can be integrated in such an object.

In at least one disclosed embodiment, the acquisition unit is in contact with the skin of the user. This can mean that at least part of the unit is in mechanical or direct contact with the skin of the user. This results in a further improvement in the reliability of determining the at least one state variable, for example, the skin temperature and the skin humidity.

In another disclosed embodiment, the acquisition unit may be a watch or integrated in a watch. This means that an everyday object having skin contact can be used to perform the method, avoiding the need for the user to wear additional elements.

In another disclosed embodiment, the at least one target state variable is defined on the basis of the at least one initial state variable. The initial state variable can equal the actual state variable determined at the start time. At least two different initial state variables can each be associated with one of at least two different target state variables. In other words, the target state variable can depend on the initial state variable.

The conventional assumption is that precisely one predetermined target state variable must be set to ensure thermal comfort of the user, with this state variable being set independently of other parameters. Surprisingly, however, it has been found that thermal comfort of a person also depends on conditions that prevailed at the start of a change to the comfort state. For instance, it was possible to establish that the same thermal comfort state of a person existed for different target skin temperatures, with the target skin temperature depending on what initial skin temperature existed at the start of a change in the skin temperature.

For example, a target state variable having a first value can be defined as the target state variable if the initial state variable is greater than or equal to a predetermined threshold value. Thus in this case, all the initial state variables from a first interval, which is unbounded on one side and has a minimum limit equal to the predetermined threshold value, can be associated with a common target state variable.

In addition, a target state variable having a further value can be defined as the target state variable if the at least one initial state variable is less than the predetermined threshold, where the first value is greater than the further value. Thus in this case, all the initial state variables from a further interval, which is unbounded on one side and has a maximum limit equal to the predetermined threshold, can be associated with a common target state variable.

It is also possible, however, that each initial state variable from the first and/or further interval is associated with a target state variable specific to that initial state variable.

The setting of the thermal comfort state can thereby be adapted to a lag in a subjective sensation of comfort.

In another disclosed embodiment, the at least one state variable is additionally acquired prior to the start time. For instance, a variation over time of the state variable can be stored with a time association. For example, the at least one state variable can be acquired at at least one predetermined time, optionally at a plurality of predetermined times and/or in a predetermined time interval before the start time. It is also possible for the state variable to be acquired and stored continuously or regularly. In this case, for instance, the variation over time of the state variable can be stored during a time period of predetermined length before a current point in time.

In addition, the at least one variation unit for varying the state variable is additionally controlled on the basis of the state variable acquired prior to the start time. For this purpose, the acquisition unit can transmit the stored state variable to the vehicle. Alternatively, however, the unit can also define and transmit to the vehicle a control profile based on the state variable acquired prior to the start time.

It is thereby possible to detect, for example, whether a user was already in a cool environment for a prolonged period before the start time, and thus has cooled down. In this case, for example, a greater supply of heat into the vehicle interior and/or to the user may be necessary than in the case when cooling down was only short.

Of course it is also possible to control prior to the start time the at least one variation unit for varying the state variable or a state variable, which is explained in greater detail below. For instance, it is thereby possible to set an interior temperature of the vehicle prior to the start time based on the at least one state variable acquired prior to the start time. An interior temperature can hence be adapted to a sensation of comfort by the user. This can mean that on getting in, the user does not feel the interior temperature to be too warm or too cold.

In another disclosed embodiment, at least one auxiliary variable is determined in addition to the at least one state variable. The auxiliary variable may be a physical environment variable or an intermediate variable or a physiological variable of the user, the variation of which also alters or may alter the (subjective) satisfaction of the user with the ambient climate. An intensity of the solar radiation, an air temperature, a temperature of the surrounding surface, a relative humidity, air-movement parameters, an air pressure, a composition of the air, electricity in the air, an acoustic environment parameter and/or an optical environment parameter may be determined as a physical environment variable, for example. A surrounding surface denotes here the surfaces surrounding a person, for instance, surfaces that at least partially enclose a space in which the person is located, which surrounding surface radiates or absorbs heat.

A level of clothing, a level of activity of a bodily action, adaption and acclimatization, an influencing factor that depends on a daily and/or yearly rhythm, and/or occupancy of a room or vehicle by other people may be determined as an intermediate environment variable, for example. A level of clothing can be determined, for example, on the basis of a variation over time of a seat temperature of a seat on which the occupant is located. A slow rise in the seat temperature, e.g., a temperature rise that is less than or equal to a predetermined temperature threshold value in the predetermined time period, can indicate, for instance, a high level of insulation between vehicle occupant and seat surface and hence indicate a high level of clothing. A rapid rise in the seat temperature, e.g., a temperature rise that is greater than the predetermined temperature threshold in the predetermined time period, can indicate, for instance, a low level of insulation between vehicle occupant and seat surface and thus indicate a low level of clothing.

A level of activity can be determined, for example, on the basis of a pulse rate, where, for instance, a high pulse rate, in particular a pulse rate that is greater than or equal to a predetermined threshold value, can indicate a high level of activity. Correspondingly, a low pulse rate, in particular a pulse rate that is less than a predetermined threshold value, can indicate a low level of activity.

A degree of adaption and acclimatization can be determined, for example, on the basis of a rate of change of a state variable of the occupant, e.g., of a skin temperature or skin humidity. A slow rate of change, e.g., a change that is less than or equal to a predetermined threshold value in a predetermined time period, can indicate a low degree of adaption and acclimatization. A high rate of change, e.g., a change that is greater than the predetermined threshold value in the predetermined time period, can indicate a high degree of adaption and acclimatization.

An effect of an influencing factor that depends on a daily and/or yearly rhythm can be determined, as already explained, likewise on the basis of a rate of change of at least one state variable. In this case, this state variable can be determined for a specific occupant and allocated to predetermined periods during the day and/or seasonal periods. This information can then subsequently be used as an auxiliary variable.

Occupancy of a room or vehicle can be determined on the basis of images, for example, with an image of the vehicle interior, for instance produced using a vehicle camera, being analyzed.

A food intake, an ethnicity, an age, a gender, a physical condition and/or a constitution of the user can be determined as a physiological variable, for example.

A food intake can be detected, for example, on the basis of time and/or location, for instance if the occupant is in a location which is stored, e.g., in a database, as a location of a restaurant.

An ethnicity, an age, a gender and a constitution of the user can be stored, for example.

A physical condition can be determined on the basis of at least one state variable, for example.

The at least one auxiliary variable, like the at least one state variable, can be determined prior to the start time, at the start time and/or after the start time. For example, the state variable can be estimated after the start time, for instance on the basis of a model.

An interior temperature of the vehicle and a radiation intensity of solar radiation may be determined at the start time. In addition, a radiation intensity of the solar radiation can be estimated for future points in time. Furthermore, a level of activity can be determined, for instance, on the basis of a pulse rate and/or a pattern of movement.

For the purpose of acquiring the at least one auxiliary variable, suitable acquisition units for acquiring the auxiliary variable, i.e., sensors, can be provided at the acquisition unit and/or at the vehicle. In addition, acquisition units can be used that are acquisition units or sensors that are different from the acquisition unit for acquiring the state variable. Thus, for instance, the pulse rate can be detected by an additional mobile terminal, for instance a cell phone. Naturally in this case, the acquisition unit for acquiring the auxiliary variable can communicate by means of data and/or signals with the acquisition unit and/or the vehicle.

In addition, the at least one variation unit for varying the state variable can additionally be controlled on the basis of the acquired auxiliary variable. This results in a further improvement, for instance, speeds up, the setting of the thermal comfort state to a desired target state. For instance, for a high radiation intensity of the solar radiation, a heat output from a heating or air conditioning system can be reduced.

In another disclosed embodiment, one control profile for controlling the at least one variation unit for varying the state variable is associated with a number of state profiles. This can be a lookup table (conversion table). In this case, the association of the state profile with the particular control profile is known in advance. The control profile may be a control profile for setting the at least one target state variable, which is defined on the basis of the target comfort state. Thus the control profile can depend on the target comfort state or be associated therewith. The initial comfort state can be defined on the basis of the state profile. Thus a comfort state can be associated with a state profile.

The state profile comprises at least the at least one state variable at the start time. Optionally, however, the state profile can also comprise at least one further state variable, a variable that depends on the variation over time of the at least one state variable before the start time, a variable that depends on an estimated variation over time of the at least one state variable after the start time, at least one auxiliary variable and/or at least one variable that depends on the variation over time of the at least one auxiliary variable before the start time, and/or a variable that depends on an estimated variation over time of the at least one auxiliary variable after the start time.

A control profile can comprise or contain, for example, at least one input variable, for example, a variation over time of the input variable, of the at least one variation unit for varying the state variable. For instance, the control profile can comprise or contain, e.g., a variation over time of an input voltage or of an input current for an electric heating system of the vehicle.

The association of the state profile with the particular control profile can be a user-specific and/or vehicle-specific association. This can mean that a state profile is associated with a user-specific and/or vehicle-specific control profile. Of course it is also possible, however, for at least some of the association of the state profile with the particular control profile to be generic, e.g., to be user-specific but not vehicle-specific, or vehicle-specific but not user-specific.

The association of state profiles with control profiles can be determined by preliminary tests. As explained in greater detail below, this association can also be adapted and/or expanded as part of a self-learning system.

At the start time, the control profile that has a state profile having a minimum difference from the state profile that exists at the start point is selected for controlling the at least one variation unit for varying the state variable.

This results in easy control of the at least one variation unit for varying the at least one state variable.

In another disclosed embodiment, a state profile is defined at the start time, wherein a variation over time of the at least one state variable is additionally acquired after the start time. Of course it is also possible to acquire a variation over time of the aforementioned further variables of the state profile.

In addition, a control profile for controlling the at least one variation unit for varying the state variable is defined on the basis of the variation over time and is assigned to the state profile. An existing control profile, which is associated with the state profile, can be altered, with the altered control profile then being assigned to the state profile. The control profile can be defined such that a length of time for reaching the at least one target variable is reduced or even minimized. For example, it is possible to measure the length of time required by a previous control profile to reach the at least one target variable. Subsequently, the control profile can be adapted such that this length of time is reduced. For example, at least one input variable of the control profile for a subsequent control process can be altered by a predetermined amount, although by not more than a predetermined maximum amount. For instance, an input current for a heater can be increased if the comfort index increases only slowly. In a subsequent activation of the control profile, it can be ascertained whether a faster change is made towards a target comfort state. The control profile can thereby be adapted iteratively. Furthermore, it is additionally possible to detect manual interventions in the control profile, for example, intervening in an input variable, in particular intervening in a variation over time of the input variable, after the start time. The manual interventions can be interpreted here as a user wish. An existing control profile can in this case be altered so as to incorporate the change effected by the manual intervention in the control profile. A self-learning system can thereby be created.

Hence, a user-specific control profile can be created. Thus it is conceivable that in an initial state there are one or more standardized standard control profiles available. These can then be adapted in a user-specific manner, as explained above.

Of course the adaptation of the control profile on the basis of manual interventions can also be made only once a manual intervention is made repeatedly, for instance at least three times.

In addition, it is evidently also possible to make a manual change to the at least one target variable. For example, the user can correct the target variable, for instance the skin temperature. In this case, this changed target variable can be assigned to the state profile at the start time, and a control profile defined, for instance, altered, such that the changed target variable is attained, for instance, after a predetermined time period. Of course the change to the target variable can also be performed only once the user has changed the target variable more than once, for example, more than three times.

In at least one disclosed embodiment, the control profiles are already associated with a user or are assigned to a user. In this case, the user can be identified, for example, on the basis of a user-specific identifier and/or on the basis of user-specific parameters. The identifier and/or the user-specific parameters can be acquired by the acquisition unit for acquiring the state variable or by another acquisition unit, for instance.

Thus it is also possible that the portable acquisition unit can be used by further users, in which case hence also further user-specific control profiles can be used. If specific control profiles are not yet available for a user, the aforementioned standard control profiles or control profiles of a similar user can be used and adapted. A similar user can be determined, for example, on the basis of age, gender, daily rhythm and yearly rhythm.

In another disclosed embodiment, the control profiles are stored in at least one memory unit of the vehicle or in at least one memory unit of the acquisition unit for acquiring the at least one state variable. If the control profiles are stored in at least one memory unit of the acquisition unit, then the acquisition unit can be used to control variation units of a plurality of vehicles.

For instance, if a control profile is defined by the acquisition unit and transmitted to the vehicle, then the control profile can be transmitted to the vehicle in a form that is standardized for a plurality of vehicles, with vehicle-specific adaptation, for instance, conversion, of the transmitted control profiles taking place to control the vehicle-based variation unit.

In another disclosed embodiment, an energy consumption required to attain the target state variable is determined on the basis of the difference between the actual state variable and the target state variable. For example, an electrical energy consumption for operating an electric heating system can be determined. For electric vehicles, a predicted range can be updated on the basis of the energy consumption determined in this way.

This improves the operation of the vehicle.

In at least one disclosed embodiment, at least a skin temperature and a skin humidity are determined as the state variables. This achieves that a desired thermal comfort state is set reliably.

The method can also be performed for more than one user or vehicle occupant. In this case, for instance, a vehicle interior can be divided into a plurality of spatial regions, which are also referred to as comfort zones, with the method being performed for each region and for the user occupying the region concerned.

Alternatively, the method can also be performed for a selected user of the plurality of users. Thus, for instance, it is conceivable that the method is performed for the vehicle driver when there are a plurality of users. It is also conceivable that the method is performed for a passenger or passengers, for example, in a chauffeur situation. It is also conceivable that the method is performed for the user who last got into the vehicle.

Of course it is also possible to define a user-specific control profile for each user, and then to define a merged control profile, for instance a control profile obtained as an average or as a weighted average, on the basis of all the user-specific control profiles and to use the merged control profile to control the at least one variation unit for varying the state variable.

An apparatus for setting a thermal comfort state of at least one user of a vehicle is also proposed. The apparatus can also be referred to as a system. The apparatus comprises at least one acquisition unit for acquiring at least one state variable, and at least one analysis unit. The analysis unit can be based at the acquisition unit and/or based at the vehicle. In addition, the analysis unit can comprise a group of analysis units, with parts of the group being based at the acquisition unit and remaining parts of the group being based at the vehicle.

At a start time, at least one actual state variable of the user can be acquired by the acquisition unit for acquiring the at least one state variable. In addition, the analysis unit can define an initial comfort state of the user on the basis of the at least one actual state variable. In addition, a target comfort state can be defined and a target state variable can be defined on the basis of the target comfort state. Furthermore, at least one vehicle-based variation unit for varying the state variable, which unit likewise can be part of the proposed apparatus, can be controlled, for instance by a control unit, which may also be part of the proposed apparatus, so as to minimize a difference between the actual state variable and the target state variable, if the target comfort state differs from the initial comfort state. For instance, at least one input variable for a variation unit for varying the state variable can be determined by the analysis unit or an additional analysis unit such that a difference between the actual state variable and the target state variable is minimized.

The acquisition unit for acquiring the at least one state variable is a unit that can be worn by the user. The acquisition unit can be a mobile terminal, optionally a watch, or integrated in such a device.

The aforementioned control unit and/or additional analysis unit can likewise be based at the vehicle or at the acquisition unit.

In addition, the apparatus can obviously comprise the aforementioned memory unit, communications unit and the variation unit for varying the state variable. Thus the proposed apparatus can comprise units arranged in or on the vehicle and also units designed to be structurally separate from the vehicle.

The apparatus is designed such that it can be used to perform a method according to any of the embodiments described above.

FIG. 1 shows a block diagram of an apparatus 1 for setting a thermal comfort state of a user 2 of a vehicle 3. The apparatus 1 comprises a unit 4 for acquiring a skin temperature HT and a skin humidity of the user 2, which unit 4 is a watch or integrated in a watch. FIG. 1 does not show that the acquisition unit 4 additionally comprises a communications unit for data and/or signal communication with the vehicle 3 and comprises an analysis unit and at least one memory unit.

The vehicle 3 comprises a communications unit 5, which can be used to perform data and/or signal communication with the acquisition unit 4. In addition, the vehicle 3 comprises a control unit 6. The control unit 6 can be used to control an operation of an air conditioning system 7, a ventilation system 8 and an infrared radiation unit 9 in the vehicle 3. An inside temperature of the vehicle 3 can be adjusted by means of the air conditioning system 7. An air flow into/out of the vehicle interior can be adjusted by means of the ventilation system 8. A user 2 located in the vehicle interior, i.e., a vehicle occupant, can receive infrared radiation by means of the infrared radiation unit 9, whereby thermal energy can be transferred to the user 2.

The disclosed method is explained in greater detail with reference to the example flow diagram shown in FIG. 2.

In this method, a user-related acquisition of at least one state variable, for instance, the skin temperature HT and skin humidity, is performed in a first operation at S1. This acquisition can take place continuously. In addition, the at least one state variable acquired in this way can be stored. For instance, a variation over time of the state variable can be stored for a predetermined time interval, for example, the last 30 minutes, before a current point in time.

In a second method operation at S2, at a start time t0 (see FIG. 5), an interior temperature of the vehicle 3 (see FIG. 1) is determined. The vehicle 3 can comprise for this purpose a temperature sensor, which is not shown in FIG. 1. The interior temperature can then be transmitted to the acquisition unit 4. In addition in the second operation at S2, the current skin temperature HT and skin humidity are acquired at the start time t0. In addition in the second operation at S2, a radiation intensity of solar radiation can be determined at the start time t0. The radiation intensity can also be acquired at the vehicle and transmitted to the unit 4. It is also possible, however, to transmit the skin temperature HT and skin humidity to the vehicle 3.

The interior temperature, the current skin temperature HT, the current skin humidity, the intensity of the solar radiation and the stored variation over time of the skin temperature HT and of the skin humidity (or a variable dependent thereon) are combined as a state profile, for instance as a state vector. This creation of the state vector can be performed at the acquisition unit, for example, by the analysis unit of the acquisition unit 4, or at the vehicle, for example, by the control unit 6. For this purpose, all the variables needed for the definition can be transmitted by data and/or signal communication to the relevant unit. An initial comfort state can be determined on the basis of the generated state profile.

In a third operation at S3, the state profile generated in this manner is compared with existing and stored state profiles, where each existing state profile is associated with a control profile for controlling the air conditioning system 7, the ventilation system 8 and the infrared radiation unit 9, i.e., a lookup table for attaining a target comfort state and/or the target state variable dependent on the target comfort state. A control profile here refers to a variation over time of an input variable, for instance an input voltage, of the air conditioning system 7, the ventilation system 8 and the infrared radiation unit 9. The existing state profiles and the control profiles associated therewith can be stored at the unit or at the vehicle.

In addition in the third operation at S3, the existing state profile is selected that has the smallest difference from the created state profile. For instance, a vector distance between the state profiles defined as state vectors can be determined, where the smallest difference exists for the smallest vector distance.

In a fourth operation at S4, the relevant control profile is used for controlling the air conditioning system 7, the ventilation system 8 and the infrared radiation unit 9. The fourth operation at S4 and the comparison in the third operation at S3 are only performed if the target comfort state differs from the initial comfort state.

In a fifth operation at S5, manual changes to the input variables of the air conditioning system 7, the ventilation system 8 and the infrared radiation unit 9 can be detected. The selected control profile can be altered on the basis of these manual changes, thereby providing a self-learning system. This altered control profile can then be used for the user 2 in later control processes. The altered control profile can obviously be assigned to the initially defined state profile.

Figure 2:
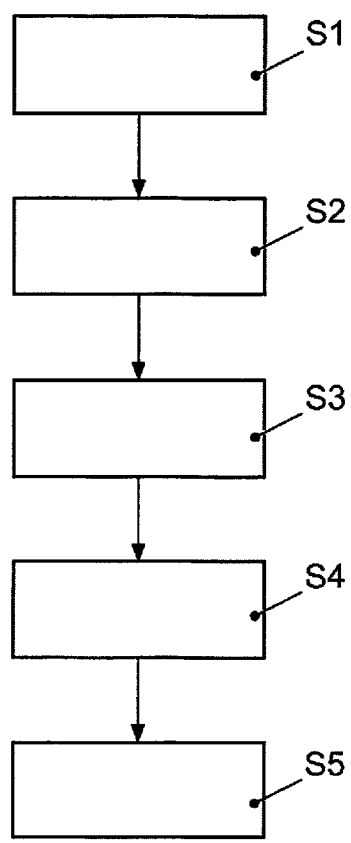
FIG. 2 is a flow diagram of a disclosed method.
Figure 3:
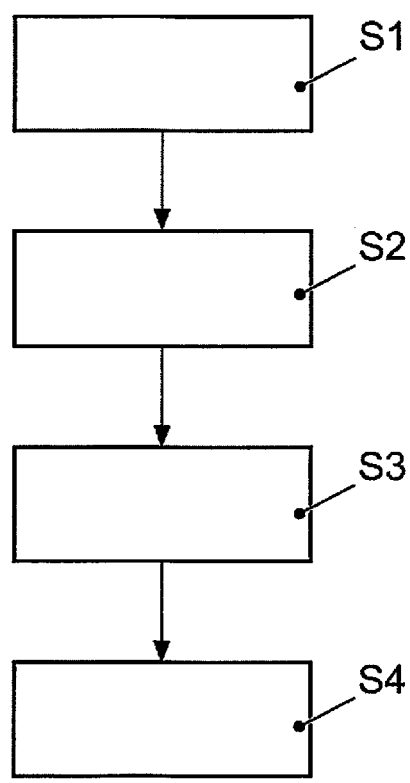
FIG. 3 is a flow diagram of a definition of control profiles.

FIG. 3 shows a flow diagram for creating a control profile. In a first operation at S1, as already described in FIG. 2, the at least one state variable is acquired, for instance by means of the acquisition unit 4 shown in FIG. 1. In addition, additional auxiliary variables, for example, an external temperature, an air humidity, an intensity of the solar radiation, a time of day and a level of activity of the user, are acquired in the first operation. A current state of a biorhythm of the user can be determined on the basis of the time of day. The level of activity can be determined, for example, on the basis of a pulse rate and/or a pattern of movement of the user. The acquisition unit 4 can in this case likewise be used to acquire one, a plurality of, or all the aforementioned auxiliary variables. Of course also further acquisition units (not shown), for instance a cellphone, can be used to acquire one, a plurality of, or all the auxiliary variables.

In a second operation at S2, an interior temperature of the vehicle 3 (see FIG. 1) is determined at a start time.

In a third operation at S3, as already as explained in association with FIG. 2, a control profile is selected and used for controlling the air conditioning system 7, the ventilation system 8 and the infrared radiation unit 9 (see FIG. 1). Simultaneously in the third operation at S3 takes place an acquisition of the at least one state variable, an acquisition of the at least one auxiliary variable and an acquisition of the operations to change the thermal comfort state of the user 2. Hence the aforementioned manual changes to the control variables can be acquired amongst other variables. In addition, for example, an intensity of the solar radiation, an air humidity in the vehicle interior and a level of closing of the user 2 can also be acquired.

In a fourth operation at S4, a user-specific control profile is then generated on the basis of the acquired data such that a desired thermal comfort state KZ (see FIG. 5) is attained as quickly as possible.

This control profile can then be used for the user 2 in later control processes. The control profile can evidently be assigned to the initially determined state profile.

Figure 4:
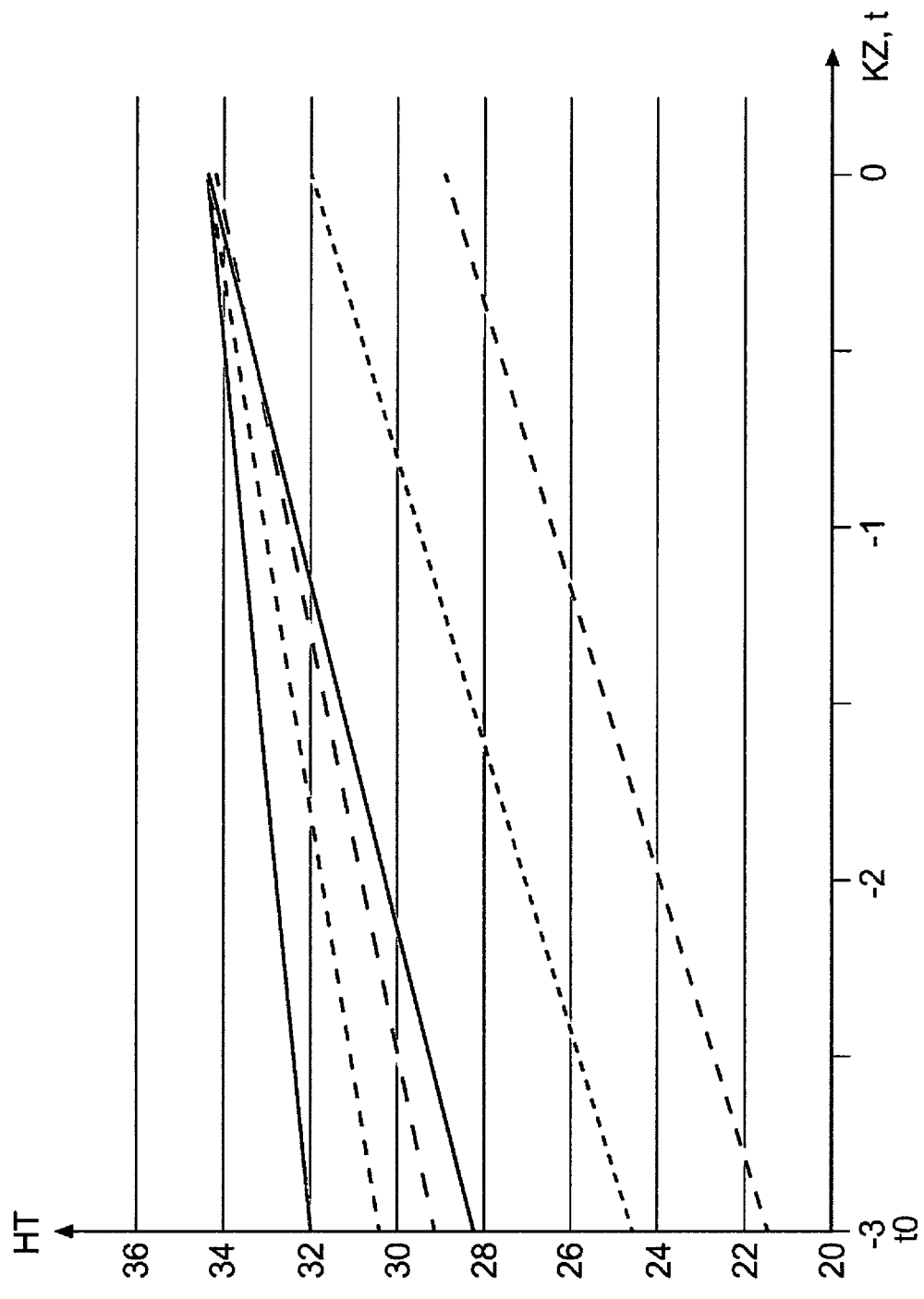
FIG. 4 shows an example association between initial skin temperatures and target skin temperature.

FIG. 4 shows an example association between a skin temperature HT and different comfort states KZ over time t. The comfort states KZ are here encoded as comfort indices. An index of −3 corresponds to a subjective comfort sensation of "too cold". A comfort index of −2 corresponds to a subjective comfort sensation of "cold". A comfort index of −1 corresponds to a subjective comfort sensation of "cool". A comfort index of 0 corresponds to a subjective comfort sensation of "neutral". In this case, the comfort index of 0 forms a target comfort index and hence a target comfort state.

It can be seen from FIG. 4 that the target comfort state can be associated with different target temperatures depending on an initial skin temperature. The initial skin temperature here refers to a skin temperature at a start time t0.

If the skin temperature HT at a start time t0 lies above a predetermined temperature, in particular above 28.3° C., then the target temperature of the target comfort state equals a predetermined first target temperature, in particular 34.3° C. If, however, the initial skin temperature HT at the start time t0 lies below 28.3° C., then the target temperature of the target comfort state, which target temperature is different for each initial skin temperature, in each case lies below the first target temperature.

In this case, each initial skin temperature that is greater than or equal to the predetermined temperature is associated with the first target temperature. In addition, each initial skin temperature that is less than the predetermined temperature is associated with one of different target temperatures, where all of these target temperatures are less than the first target temperature.

This means that a user 2 (see FIG. 2) can attain the same comfort state KZ for different skin temperatures HT, with the particular skin temperature HT being dependent on the initial skin temperature. In this case it is possible to determine in preliminary tests an association between initial skin temperature and target skin temperature and to use the association for a subsequent control process.

Figure 5:
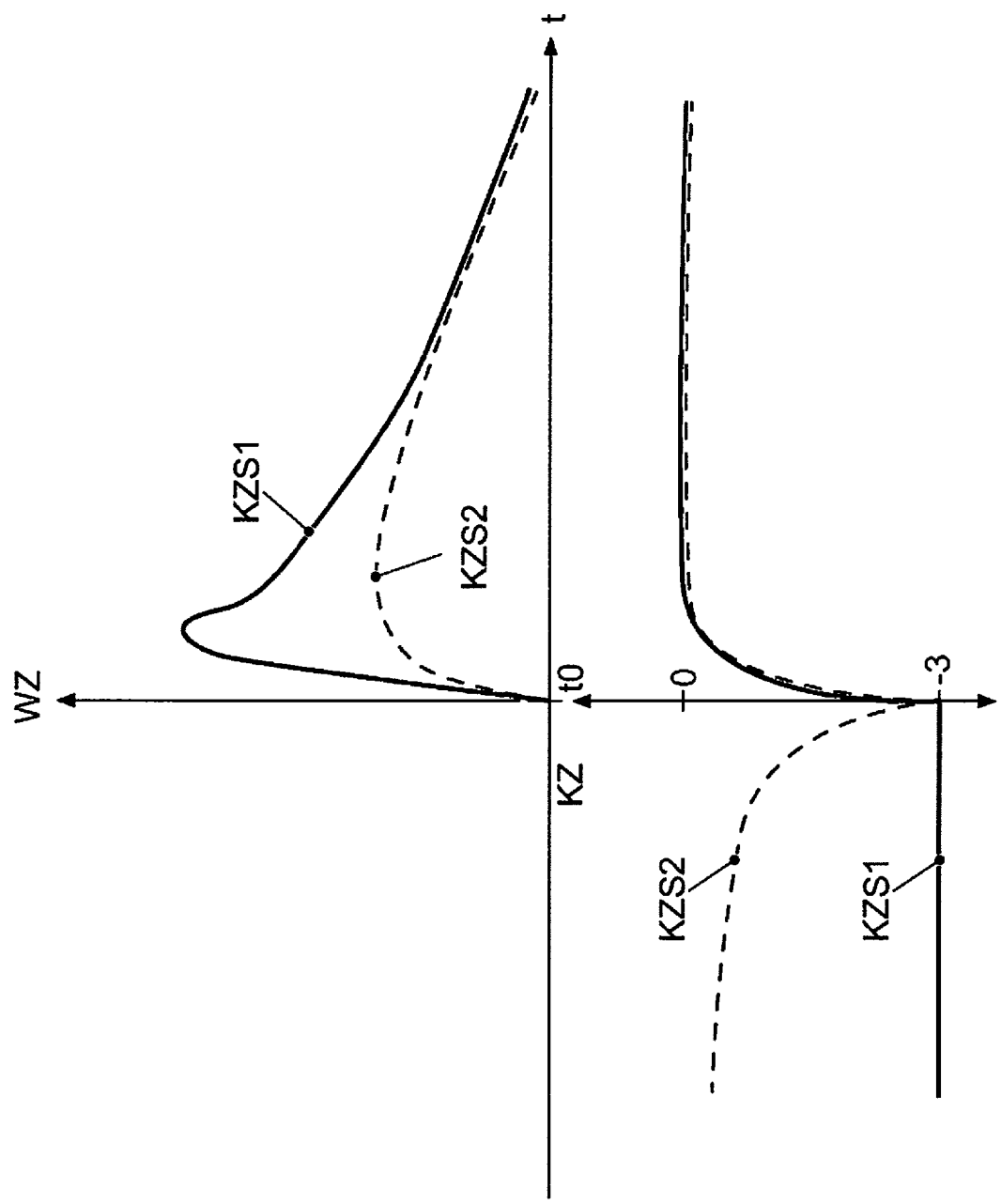
FIG. 5 shows an example relationship between a supply/removal of heat after a start point and comfort states before the start point.

FIG. 5 shows an example relationship between a variation over time of a heat supply WZ and comfort states KZ of a user 2 over time t for different scenarios. A first comfort state scenario KZS1 corresponds to a scenario in which a user 2 has been in an environment that is too cold for a prolonged period before a start time t0, for instance before a time of getting into a vehicle 3 (see FIG. 1). This is represented by a comfort state KZ of −3. A second comfort state scenario KZS2 describes a scenario in which the user 2 has been in an environment that is too cold for only a short time before the start time. FIG. 5 shows that different heat supply profiles must be used for the different comfort state scenarios KZS1, KZS2 to alter the comfort state KZ for the user 2 after getting into the vehicle 3 by the same degree to the target comfort state 0. Thus in the first comfort state scenario, a substantially higher heat supply is needed than in the second comfort state scenario KZS2. The heat supply WZ can be made via surface boundaries of the user 2, for instance by means of radiation, convection or thermal contact, in particular by the air conditioning system 7, ventilation system 8 and infrared radiation unit 9 shown in FIG. 1. Of course a heating system, for instance a seat heater, can also be used for the heat supply.

It can hold that a skin temperature HT that is less than the predetermined target temperature can indicate that the user 2 is to cool, while a skin temperature HT that is greater than or equal to the predetermined target temperature can indicate that the user 2 is not too cool.

In addition it can hold that a skin humidity that is less than or equal to a predetermined target humidity can indicate that the user 2 is not too warm, while a skin humidity that is greater than the predetermined target humidity can indicate that the user 2 is too warm.

LIST OF REFERENCES 1 apparatus
2 user
3 vehicle
4 acquisition unit
5 communications unit
6 control unit
7 air conditioning system
8 ventilation system
9 infrared radiation unit
S1 first operation
S2 second operation
S3 third operation
S4 fourth operation
S5 fifth operation
t0 start time
t time
KZ comfort state
c time
HT skin temperature

The invention claimed is:

1. A method for setting a thermal comfort state of at least one user of a transportation vehicle, the method comprising:
acquiring, prior to and at a start time, at least one actual state variable of the at least one user, by at least one acquisition unit worn by the at least one user;
defining an initial comfort state of the at least one user based on the acquired at least one actual state variable of the at least one user;
defining a target comfort state;
defining at least one target state variable based on the defined target comfort state and at least one initial state variable;
determining whether the defined target comfort state differs from the initial comfort state; and
controlling at least one transportation vehicle-based variation unit to vary the at least one state variable such that a difference between the acquired at least one actual state variable and the defined at least one target state variable is minimized in response to the defined target comfort state differing from the initial comfort state,
wherein the at least one transportation vehicle-based variation unit is controlled based on the acquired at least one actual state variable acquired prior to the start time such that the target state variable for the thermal comfort state of the at least one user is set based on that determined at least one initial state variable to provide customized thermal comfort for the at least one user based on the thermal comfort state of the at least one user at a time prior to and at the start time.

2. The method of claim 1, wherein the acquisition unit is in contact with skin of the at least one user.

3. The method of claim 1, wherein the acquisition unit is a watch or integrated in a watch.

4. The method of claim 1, further comprising determining at least one auxiliary variable, wherein the at least one transportation vehicle-based variation unit for varying the at least one state variable is controlled based on the determined auxiliary variable.

5. The method of claim 1,
wherein a control profile for controlling the at least one transportation vehicle-based variation unit for varying the at least one state variable is associated with a number of state profiles,
wherein association of the state profile with a particular control profile is known in advance,
wherein, at the start time, the control profile that has a state profile having a minimum difference from the state profile that exists at the start time is selected for controlling the at least one transportation vehicle-based variation unit for varying the at least one state variable.

6. The method of claim 1, wherein a state profile is defined at the start time, wherein a variation over time of the at least one actual state variable is acquired after the start time, wherein a control profile for controlling the at least one transportation vehicle-based variation unit for varying the at least one actual state variable is defined based on the variation over time and is assigned to the state profile.

7. The method of claim 5, wherein the control profiles are associated with the at least one user and/or are assigned to the at least one user.

8. The method of claim 5, wherein the control profiles are stored in at least one memory unit of the transportation vehicle or in at least one memory unit of the acquisition unit.

9. The method of claim 1, wherein an energy consumption required to attain the at least one target state variable is determined based on the difference between the at least one actual state variable and the at least one target state variable.

10. The method of claim 1, wherein at least one of a skin temperature and a skin humidity is determined as the at least one actual state variables.

11. The method of claim 1, wherein the thermal comfort state of the at least one user depends on conditions that prevailed at the start of a change to the target comfort state.

12. The method of claim 1, wherein a same thermal comfort state of the at least one user exists for a plurality of actual state variables.

13. The method of claim 1, wherein the at least one target state variable is defined based on whether the initial state variable is greater than or equal to a predetermined threshold value.

14. The method of claim 13, wherein all initial state variables from a first interval, which is unbounded on one side and has a minimum limit equal to the predetermined threshold value, are associated with a common target state variable associated with a target comfort state.

* * * * *